United States Patent [19]
Yamamoto et al.

[11] Patent Number: 6,121,401
[45] Date of Patent: Sep. 19, 2000

[54] PROPYLENE COPOLYMER

[75] Inventors: Keisaku Yamamoto; Hirofumi Johoji; Hidetake Hozumi, all of Chiba, Japan

[73] Assignee: Sumitomo Chemical Company, Limited, Osaka, Japan

[21] Appl. No.: 09/114,469

[22] Filed: Jul. 13, 1998

[30] Foreign Application Priority Data

Jul. 11, 1997 [JP] Japan ..................................... 9-186365

[51] Int. Cl.[7] ........................ C08F 210/02; C08F 210/06; C08F 210/14
[52] U.S. Cl. ........................ 526/348.6; 526/134; 526/161; 526/170; 526/172; 526/943; 502/104; 502/154
[58] Field of Search ............................... 526/90, 133, 134, 526/108, 160, 170, 196, 348.6, 943, 161, 172; 502/104, 154

[56] References Cited

FOREIGN PATENT DOCUMENTS

| | | |
|---|---|---|
| 4-0216841 | 8/1992 | Japan . |
| 4-216841 | 8/1992 | Japan . |
| 5-098095 | 4/1993 | Japan . |
| 5-98095 | 4/1993 | Japan . |
| 8-301934 | 11/1996 | Japan . |
| 9-012635 | 1/1997 | Japan . |
| 9-12635 | 1/1997 | Japan . |
| 101 584 42 | 6/1998 | Japan . |

OTHER PUBLICATIONS

Qian, Yanlong et al., Syntheses, structures and reactions of some new benzyl–substituted cyclopentadienyl titanium complexes, JOMC 547 (1997) 263–279, Dec. 1997.

*Primary Examiner*—David W. Wu
*Assistant Examiner*—R. Harlan
*Attorney, Agent, or Firm*—Pillsbury Madison & Sutro

[57] ABSTRACT

A propylene copolymer obtainable by polymerizing a propylene, at least one of $\alpha$-olefin having 4–20 carbon atoms, and ethylene, in the presence of a catalyst for olefin polymerizaton including the following (A), (B) and/or (C):

(A) at least one transition metal complex;
(B) at least one aluminum compound; and
(C) boron compound.

13 Claims, No Drawings

PROPYLENE COPOLYMER

BACKGROUND OF THE INVENTION

1. Field of the Invention

The present invention relates to a propylene copolymer and a thermoplastic resin composition. More particularly, the invention relates to a novel propylene copolymer which gives excellent thermoplastic resin composition having outstanding flexibility in mixing with a resin like polypropylene, use of said propylene copolymer as a polyolefin resin modifier, and a thermoplastic resin composition containing said olefin copolymer and polyolefin resin.

2. Description of the Related Art

Polypropylene resin has been used for various ends widely as a resin having excellent properties in stiffness, thermal deformation temperature, surface hardness, etc. but it has defects in impact resistance and flexibility. As a method for improving these defects, the procedures to blend the polypropylene resin with a low-crystalline ethylene-α-olefin copolymer such as ethylene-propylene copolymer, ethylene-1-butene copolymer are well known. Japanese Patent KOKAI Publication No. 98095/1993 discloses that a thermoplastic resin composition made by blending a specific ethylene-propylene-1-butene copolymer with the polypropylene resin along with an inorganic filler has excellent impact resistance and surface hardness.

On the other hand, the propylene copolymer obtained by copolymerizing propylene with ethylene or α-olefin by using a solid state titanium catalyst has excellent transparency, impact resistance, heat sealing property, etc. which cannot be attained by homopolypropylene. Such a copolymer is extensively used for automobile material, construction material, industrial material, cable material, polyolefin modifying material, packaging film, etc. Among them, as the modifying material especially for polyolefin resin, the demands for improving flexibility, impact resistance and heat sealing property of polypropylene have been particularly increasing. However, with the conventional propylene copolymer or polyolefin material modifying with the propylene copolymer, there has been the effects of the composition distribution of the propylene copolymers and said materials did not necessarily reach the required levels in flexibility and transparency. In Japanese Patent KOKAI Publication No. 12635/1997 there is disclosed a propylene-1-buten-ethylene copolymer obtained by using a specific metallocene catalyst. Since said propylene-1-buten-ethylene copolymers have narrow molecular weight distribution and contain 1-butene and ethylene in specific proportions, said copolymer has excellent transparency, stiffness, heat sealing property, impact absorbing property, and can be the suitable materials as a modifier for resin. In Japanese Patent KOKAI Publication No. 301934/1996 also there is disclosed a propylene-ethylene-α-olefin copolymer obtained by using a metallocene catalyst, and there is disclosed that these propylene-ethylene-α-olefin copolymers have narrow molecular weight distribution and composition distribution, and have excellent strength and low permanent elongation, and good transparency in comparison with the conventional propylene-ethylene-α-olefin olefin copolymers obtained by the solid state titanium catalysts because they contain ethylene and α-olefin in specific proportions. Said copolymers can be the polyolefin materials having excellent heat resistance as the modifying materials for polyolefin resin.

However, in recent years, even in the field in which the soft vinyl chloride resin and the like were used, demands for using a polyolefin material have come to be enlarged. In such uses, the higher performances are required in the aspects of flexibility, heat resistance, scratch resistance, transparency, etc. In the procedures of blending the polypropylene resin with a low crystalline ethylene-α-olefin copolymer, or propylene copolymers obtained by using the solid state titanium catalyst, or the polyolefin materials using the propylene copolymers disclosed in Japanese Patent KOKAI publications No. 12635/1997 and No. 301934/1996 and polyolefin materials using said propylene copolymers as a modifier, said materials have not necessarily satisfied the required levels.

The present inventors have intensively studied on the propylene copolymers, and have found that the materials having excellent flexibility can be obtained by using the propylene copolymers obtained by using a specific metallocene catalyst as a modifier.

SUMMARY OF THE INVENTION

Under these circumstances, the objectives of the present invention are to provide a novel propylene copolymer which gives a thermoplastic resin composition having excellent flexibility when mixed with a resin such as polypropylene, a use of said propylene copolymer as a polyolefin resin modifier, and a thermoplastic resin composition containing said propylene copolymer and polyolefin resin.

Namely, the invention relates to a propylene copolymer obtainable by polymerizing a propylene, one or more of α-olefin having 4–20 carbon atoms and ethylene in the presence of a catalyst for olefin polymerization comprising the following (A), (B) and/or (C):

(A) at least one transition metal complex represented by the following formulas [I], [II] or [III]

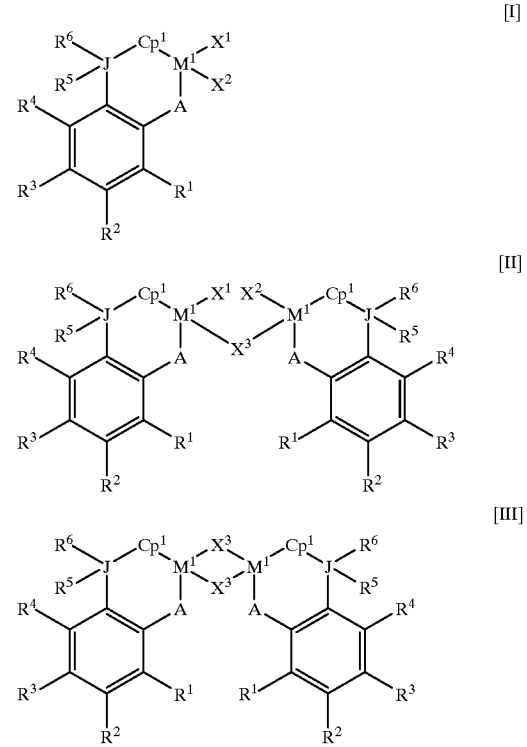

wherein $M^1$ represents a transition metal atom of the group IV in the Periodic Table of the Elements; A represents an atom of group XVI in the Periodic Table of the Elements; J represents an atom of the group XIV of the Periodic Table of the Elements; $Cp^1$ represents a group having a cyclopentadiene type anion skeleton; $X^1, X^2, R^1, R^2, R^3, R^4, R^5$ and $R^6$ independently represent a hydrogen atom, a halogen atom, an alkyl group, an aralkyl group, an aryl group, a substituted silyl group, an alkoxygroup, an aralkyloxy group, an aryloxy group, or a disubstituted amino group; and $R^1, R^2, R^3, R^4, R^5$ and $R^6$ may be combined optionally to form a ring, $X^3$ represents an atom of the group XVI in the Periodic Table of the Elements; two of $M^1, A, J, Cp^1, X^1, X^2, X^3, R^1, R^2, R^3, R^4, R^5$ and $R^6$ may be the same or different;

(B): one or more of aluminum compounds selected from the following (B1)–(B3):
(B2) An organoaluminum compound represented by the general formula $E^1{}_a AlZ_{3-a}$,
(B2) cyclic aluminoxane represented by the general formula $\{-Al(E^2)-O-\}_b$ and
(B3) linear aluminoxane represented by the general formula $E^3\{-Al(E^3)-O-\}_c AlE^3{}_2$ (wherein $E^1$, $E^2$ and $E^3$ respectively represent a hydrocarbon group and all of $E^1$, $E^2$ and $E^3$ may be the same or different; Z represents a hydrogen atom or a halogen atom and all of Z may be the same or different; a satisfies the following equation: $0<a\leq 3$; b represents an integer of 2 or more; and c represents an integer of 1 or more.)

(C): any one of boron compound of the following (C1)–(C3):
(C1) boron compound represented by the general formula $BQ^1Q^2Q^3$,
(C2) boron compound represented by the general formula $G^+(BQ^1Q^2Q^3Q^4)^-$ and
(C3) boron compound represented by the general formula $(L-H)^+(BQ^1Q^2Q^3Q^4)^-$ (wherein B represents a trivalent boron atom in the valence state; and $Q^1$ to $Q^4$ may be the same or different and represent a halogen atom, a hydrocarbon group, a halogenated hydrocarbon group, a substituted silyl group, an alkoxy group or a disubstituted amino group. $G^+$ is an inorganic or organic cation; L is a neutral Lewis base; and $(L-H)^+$ is a Bronsted acid.)

DETAILED DESCRIPTION OF THE INVENTION

The propylene copolymer of the present invention is a propylene copolymer obtainable by polymerizing a propylene, one or more of α-olefin having carbon atoms of 4–20 and ethylene in the presence of a catalyst for olefin polymerization comprising the following (A), (B) and/or (C):

(A) at least one transition metal complex represented by the following formulas [I], [II] or [III]

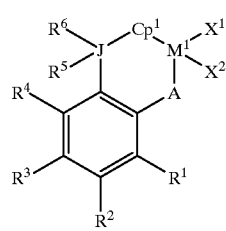

[I]

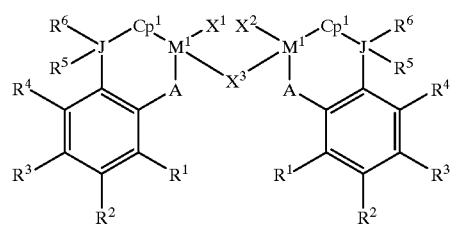

[II]

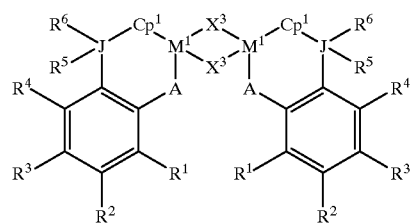

[III]

wherein $M^1$ represents a transition metal atom of the group IV in the Periodic Table of the Elements; A represents an atom of group XVI in the Periodic Table of the Elements; J represents an atom of the group XIV of the Periodic Table of the Elements; $Cp^1$ represents a group having a cyclopentadiene type anion skeleton; $X^1, X^2, R^1, R^2, R^3, R^4, R^5$ and $R^6$ independently represent a hydrogen atom, a halogen atom, an alkyl group, an aralkyl group, an aryl group, a substituted silyl group, an alkoxy group, an aralkyloxy group, an aryloxy group, or a disubstituted amino group; and $R^1, R^2, R^3, R^4, R^5$ and $R^6$ may be combined optionally to form a ring, $X^3$ represents an atom of the group XVI in the Periodic Table of the Elements; two of $M^1, A, J, Cp^1, X^1, X^2, X^3, R^1, R^2, R^3, R^4, R^5$ and $R^6$ may be the same or different;

(B): one or more of aluminum compounds selected from the following (B1)–(B3):
(B1) An organoaluminum compound represented by the general formula $E^1{}_a AlZ_{3-a}$,
(B2) cyclic aluminoxane represented by the general formula $\{-Al(E^2)-O-\}_b$ and
(B3) linear aluminoxane represented by the general formul $E^3\{-Al(E^3)-O-\}_c AlE^3{}_2$ (wherein $E^1$, $E^2$ and $E^3$ respectively represent a hydrocarbon group and all of $E^1$, $E^2$ and $E^3$ may be the same or different; Z represents a hydrogen atom or a halogen atom and all of Z may be the same or different; a satisfies the following equation: $0<a\leq 3$; b represents an integer of 2 or more; and c represents an integer of 1 or more.)

(C): any one of boron compound of the following (C1)–(C3):
(C1) boron compound represented by the general formula $BQ^1Q^2Q^3$,
(C2) boron compound represented by the general formula $G^+(BQ^1Q^2Q^3Q^4)^-$ and
(C3) boron compound represented by the general formula $(L-H)^+(BQ^1Q^2Q^3Q^4)^-$ wherein B represents a trivalent boron atom in the valence state; and $Q^1$ to $Q^4$ may be the same or different and represent a halogen atom, a hydrocarbon group, a halogenated hydrocarbon group, a substituted silyl group, an alkoxy group or a disubstituted amino group. $G^+$ is an inorganic or organic cation; L is a neutral Lewis base; and $(L-H)^+$ is a Bronsted acid.

The α-olefin having 4–20 carbon atoms includes a straight-chain and a branched α-olefin. Specific examples of the straight-chain α-olefin include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene, 1-eicocene, etc. Examples branched α-olefins include 3-methyl-1-butene, 3-methyl-1-pentene, 4-methyl-1-pentene, 2-ethyl-1-hexene, 2,2,4-trimethyl-1-pentene, etc.

Hereinafter, the present invention will be described in more detail.

(A) Transition Metal Complex is Explained.

In the general formulas [I], [II] or [III], the transition metal atom represented by $M^1$ is a transition metal element of the group IV of the Periodic Table of the Elements (Revised Version 1989 of IUPAC, Inorganic Chemistry Nomenclature) and examples thereof include titanium atom, zirconium atom, hafnium atom and the like, preferably titanium atom and zirconium atom.

Examples of the atom of the group XVI in the Periodic Table of the element represented by "A" in general formulas [I], [II] or [III] include oxygen atom, sulfur atom, selenium atom, etc., preferably oxygen atom.

Examples of the atom of the group XIV in the Periodic Table of the element represented by "J" in general formulas [I], [II] or [III], include carbon atom, silicon atom, germanium atom are the like, preferably carbon atom or silicon atom.

Examples of the group having a cyclopentadiene type anion skeleton represented by the substituent $Cp^1$ include $\eta^5$-(substituted) cyclopentadienyl group, $\eta^5$-(substituted) indenyl group, $\eta^5$-(substituted) fluorenyl group, etc. Examples thereof are $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadieyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethyl indenyl group, $\eta^5$-ethylindenyl group, $\eta^5$-n-propylindenyl group, $\eta^5$-isopropylindenyl group, $\eta^5$-n-butylindtnyl group, $\eta^5$-sec-butylindenyl group, $\eta^5$-tert-butylind#nyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propyliluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-t)utyldimethylsilylfluorenyl group, etc., preferably $\eta^5$-cyclopentadienyl group, $\eta^5$-methylcyclopentadienyl group, $\eta^5$-tert-butylcyclopentadienyl group, $\eta^5$-tetramethylcyrlopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include fluorine atom, chlorine atom, bromine atom, iodine atom and the like, preferably chlorine atom or bromine atom, more preferably chlorine atom.

As the alkyl group in the substituents $X^1$, $X^2$, $R^1$, $R^2$, $R^3$, $R^4$, $R^5$ and $R^6$, the alkyl group having carbon atoms of 1–20 is preferable. Examples of the alkyl group include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably methyl group, ethyl group, isopropyl group, tert-butyl group and amyl group.

These alkyl groups may be substituted with the halogen atom such as fluorine atom, chlorine atom, bromine atom, iodine atom and the like. Examples of the alkyl group having carbon atoms of 1–20 substituted with the halogen atom include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group and the like.

These alkyl groups may be partially substituted by an alkoxy group such as methoxy group, ethoxy group, an aryloxy group such as phenoxy group, or aralkyloxy group such as benzyloxy group, etc.

As the aralkyl group in the substituents $X^1$, $X^2$, $R^1$, $R^2$, $R^3$, $R^4$, $R^5$ and $R^6$, the aralkyl group having carbon atoms of 7–20 is preferable. Examples of such aralkyl group include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4, 6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl) methyl group, (ethylphenyl)methyl group, (n-propylphenyl) methyl group, (isopropylphenyl)methyl group, (n-butylphenyl)methyl group, (sec-butylphenyl)methyl group, (tert-butylphenyl)methyl group, (n-pentylphenyl) methyl group, (neopentylphenyl)methyl group, (n-hexylphenyl)methyl group, (n-octylphenyl)methyl group, (n-decylphenyl)methyl group, (n-dodecylphfenyl)methyl group, (n-tetradecylphenyl)methyl group, naphthylmethyl group, anthracenylmethyl group, etc., preferably benzyl group.

These aralkyl groups may be partially substituted with the halogen atom such as fluorine atom, chlorine atom, bromine atom, iodine atom, alkoxy group such as methoxy, ethoxy, aryloxy group such as phenoxy, or aralkyloxy group such as benzyloxy, and the like.

As the aryl group in the substituents $X^1$, $X^2$, $R^1$, $R^2$, $R^3$, $R^4$, $R^5$ and $R^6$, the aryl group having carbon atoms of 6–20 is preferable. Examples of such aryl group include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., preferably phenyl group.

These aryl groups may be partially substituted with the halogen atom such as fluorine atom, chlorine atom, bromine atom, iodine atom, alkoxy group such as methoxy, ethoxy, aryloxy group such as phenoxy, or aralkyloxy group such as benzyloxy, and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group include alkyl group having carbon atoms of 1–10 such as methyl group, ethyl group, n-propyl group, isopropyl group, n-butyl group, sec-butyl group, tert-butyl group, isobutyl group, n-pentyl group, n-hexyl group, cyclohexyl group, etc.; and aryl group such as phenyl group, etc. Examples of the substituted silyl group having carbon atoms of 1–20 include monosubstituted silyl group having carbon atoms of 1–20 such as methylsilyl group, ethylsilyl group, phenylsilyl group, etc.; disubsituted silyl group having carbon atoms of 2–20 such as dimethylsilyl group, diethylsilyl group, diphenylsilyl group, etc.; and trisubstituted silyl group having carbon atoms of 3–20 such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group and triphenylsilyl group.

The hydrocarbon group of these substituted silyl groups may be substituted with the halogen atom such as fluorine atom, chlorine atom, bromine atom, iodine atom and the like, alkoxy group such as methoxy, ethoxy, aryloxy group such as phenoxy, or aralkyloxy group such as benzyloxy, and the like.

With respect to the alkoxy group in the substituents $X^1$, $X^2$, $R^1$, $R^2$, $R^3$, $R^4$, $R^5$ and $R^6$, the alkoxy group having carbon atoms of 1–20 is preferable. Examples of the alkoxy group include methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodexoxy group, n-pentadecoxy group, n-icosoxy group, etc., preferably methoxy group, ethoxy group and t-butoxy group.

These alkoxy groups may be partially substituted with the halogen atom such as fluorine atom, chlorine atom, bromine atom, iodine atom and the like, alkoxy group such as methoxy, ethoxy, aryloxy group such as phenoxy, or aralkyloxy group such as benzyloxy, and the like.

With respect to the aralkyloxy group in the substituents $X^1$, $X^2$, $R^1$, $R^2$, $R^3$, $R^4$, $R^5$ and $R^6$, the aralkyloxy group having carbon atoms of 7–20 is preferable. Examples of the aralkyloxy group include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl) methoxy group, (2,5-dimethylphenyl)methoxy group, (2,6-dimethylphenyl)methoxy group, (3,4-dimethylphenyl) methoxy group, (3,5-dimethylphenyl)methoxy group, (2,3,4-trimethylphenyl)methoxy group, (2,3,5-trimethylphenyl) methoxy group, (2,3,6-trimethylphenyl)methoxy group, (2,4,5-trimethylphenyl)methoxy group, (2,4,6-trimethylphenyl)methoxy group, (3,4,5-trimethylphenyl) methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl) methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-tetradecylphenyl) methoxy group, naphthylmethoxy group, anthrarenyl-methoxy group, etc., preferably benzyloxy group.

These aralkyloxy groups may be partially substituted with the halogen atom such as fluorine atom, chlorine atom, bromine atom, iodine atom and the like, alkoxy group such as methoxy, ethoxy, aryloxy group such as phenoxy, or aralkyloxy group such as benzyloxy, and the like.

Examples of the aryloxy group in the substituents $X^1$, $X^2$, $R^1$, $R^2$, $R^3$, $R^4$, $R^5$ and $R^6$ include aryloxy group having carbon atoms of 6–20 such as phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenyl group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with the halogen atom such as fluorine atom, chlorine atom, bromine atom, iodine atom and the like, alkoxy group such as methoxy, ethoxy, aryloxy group such as phenoxy, or aralkyloxy group such as benzyloxy, and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of the hydrocarbon group include alkyl group having carbon atoms of 1–10 such as methyl group, ethyl group, n-propyl group, isopropyl group, n-butyl group, sec-butyl group, tert-butyl group, isobutyl group, n-pentyl group, n-hexyl group, cyclohexyl group, etc; aryl group having 6–10 carbon atoms such as a phenyl group; aralkyl group having 7–10 carbon atoms etc. Examples of the amino group disubstituted with hydrocarbon groups having 1–10 carbon atoms include a dimethylamino group, a diethylamino group, a di-n-propylamino group, a diisopropylamino group, a di-n-butylamino, a di-sec-butylamino group, a di-tert-butylamino group, a di-isobutylamino group, a tert-butylisopropylamino group, a di-n-hexylamino group, a di-n-octylamino group, a di-n-decylamino group, a diphenylamirno group, a bistrimethyl-silylamino group, a bis-tert-butyldimethylsilylamino group, etc., and preferably dimethylamino group and diethylamino group.

These disubstituted amino groups may be substituted partly with a halogen atom(s) (such as a fluorine, chlorine, or bromine, or iodine atom); an alkoxy group such as a methoxy, and ethoxy group; an aryloxy group such is a phenoxy group; or an aralkyloxy group such as a benzyloxy group.

The substituents $R^1$, $R^2$, $R^3$, $R^4$, $R^5$ and $R^6$ may be combined optionally to form a ring. $R^1$ is preferably an alkyl group), an aralkyl group, an aryl group, or a substituted silyl group. $X^1$ and $X^2$ independently represent, preferably, a halogen atom, an alkyl group, an aralkyl group, an alkoxy group, an aryloxy group, or a disubstituted amino group, and more preferably a halogen atom or an alkoxy group.

Examples of the atom of the group XVI in the Periodic Table include oxygen atom, sulfer atom, selenium atom, and preferably oxygen atom.

Examples of the transition metal complex (A) represented by the general formula [I] include methylene(cyclopentadienyl)(3,5-dimethyl-2-2phenoxy) titanium dichloride, methylene(cyclopentadienyl)(3-tert-butyl-2-2 phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-ethyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tPrt-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl) (3-phenyl-2-phenoxy)titaniumdichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl- 5-methyl-2-phenoxy)titanium dichloride, isopropylidene(cyclopentadienyl)(3-tert-butyl-5-methoxy-2-phenoxy)titanium dichloride, isopropylidene (cyclopentadienyl)(3-tert-butyl-5-chloro-2-phenoxy) titanium dichloride, isopropylidene (methylcyclopentadienyl)(3,5-dimethyl-2-phenoxy) titanium dichloride, isopropylidene (methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene (methylcyclopentadienyl)(3-tert-butyldimethylsilyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene (methylcyclopentadienyl)(3-tert-butyl-5-chloro-2-phenoxy) titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichlorilde, isopropylidene (tetramethylcyclopentadienyl)(3,5-dimethyl-2-phenoxy) titanium dichluride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene (fluorenyl)(3-tert-butyldimethylsilyl-5-methyl-2-phenoxy) titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy) titanium dichloride, diphenylmethylene(cyclopentadienyl) (3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene (methylcyclopentadienyl)(3,5-dimethyl-2-phenoxy) titanium dichloride, diphenylmethylene (methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene (methylcyclopentadienyl)(3-tert-butyldimethylsilyl-5-methyl-2-phenoxy)titanium dichloride, diphenylmethylene (methylcyclopentadienyl)(3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy) titanium dichloride, diphenylmethylene(tert-butylcyclopentadienyl)(3,5-dimethyl-2-phenoxy)titanium dichloride, diphenylmethylene(tert-butylcyclopentadienyl) (3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)( 3-tert-butyl-5-methoxy-2-phenoxy) titanium dichloride, diphenylmethylene(tert-butylcyclopentadienyl)(3-tert-butyl-5-chloro-2-phenoxy) titanium dichloride, diphenylmethylene (tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene (tetramethylcyclopentadienyl)(3-tert-butyl-5-chloro-2-phenoxy)titanium dichloride, diphenylmethylene (trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, etc., transition metal complexes wherein J in the chemical formula [I] is a carbon atom, such as compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy; and dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl- 2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, diimethylsilyl(methylcyclopentadienyl)(3,5-diamyl-2-phenoxy)titanium dichloride, diethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimthylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dirmethylsilyl(tetramethylcyclopentadienyl)(3-methyl-2-phenoxy)titanium dichloride, dimethylsilyl(tetramethylcyclopentadienyl)(3,5-dimethyl-2-phenoxy)titanium dichloride, dimethylsilyl(tetramethylcyclopentadienyl)(3-tert-butyl-2-phenoxy)titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy)titanium dichloride, dimethylsilyl(tetramethylcyclopentadienyl)(5-methyl-3-phenyl-2- phenoxy)titanium dichloride, dimethylsilyl (tetramethylcyclopentadienyl)(3-tert-butyldimethylsilyl-5-methyl-2-phenoxy)titanium dichloride, dimethylsilyl (tetramethylcyclopentadienyl)(5-methyl- 3-trimethylsilyl-2-phenoxy)titanium dichloride, dimethylsilyl (tetramethylcyclopentadienyl)(3-tert-butyl-5-methoxy-2-phenoxy)titanium dichloride, dimethylsilyl (tetramethylcyclopentadienyl)(3-tert-butyl-5-chloro-2-phenoxy)titanium dichloride, dimethylsilyl (tetramethylcyclopentadienyl)(3,5-diamyl-2-phenoxy) titanium dichloride, dimethylsilyl (trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl (trimethylsilylcyclopentadienyl)(3,5-dimethyl-2-phenoxy) titanium dichloride, dimethylsilyl (trimethylsilylcyclopentadienyl)(3-tert-butyl-2-phenoxy) titanium dichloride, dimethylsilyl (trimethylsilylcyclopentadienyl)(3-tert-butyl-5-methyl-2-phenoxy)titanium dichloride, dimethylsilyl (trimethylsilylcyclopentadienyl)(3,5-di-tert-butyl-2-phenoxy)titanium dichloride, dimethylsilyl (trimethylcyclopentadienyl)(5-methyl-3-phenyl-2-phenoxy) titanium dichloride, dimethylsilyl (trimethylsilylcyclopentadienyl)(3-tert-butyldimethylsilyl-5-methyl-2-phenoxy)titanium dichloride, dimethylsilyl (trimethylsilylcyclopentadienyl)(5-methyl- 3-trimethylsilyl-2-phenoxy)titanium dichloride, dimethylsilyl (trimethylsilylcyclopentadienyl)(3-tert-butyl-5-methoxy-2-phenoxy)titanium dichloride, dimethylsilyl (trimethylsilylcyclopentadienyl)(3-tert-butyl-5-chloro-2-phenoxy)titanium dichloride, dimethylsilyl (trimethylsilylcyclopentadienyl)(3,5-diamyl-2-phenoxy) titanium dichloride, dimethylsilyl(indenyl)(2-phenoxy) titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl (indenyl)(3-tert-butyl-2-phenoxy)titanium dichloride, dimethylsilyl(indenyl)(3-tert-butyl-5-methyl-2-phenoxy) titaniuo dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride, dimethylsilyl(indenyl)(3-tert-butyldiethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy) titanium dichloride, dimethylsilyl(indenyl)(3-tert-butyl-5-chloro-2-phenoxy)titanium dichloride, dimethylsilyl (indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl (fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl (fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethyl cyclopentadienyl)(1-naphthoxy-2-il)titanium dichloride, etc., the compounds wherein the (cyclopentadienyl) of these compounds have been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilyl cyclopentadienyl), (phenlcyclopentadienyl), (methylindenyl), or (phenylindenyl); the compounds wherein (2-phenoxy) has been changed to (3-phenyl 2-phenoxy), (3-trimthyl silyl-2-phenoxy), or (3-tert-butyldimethylsilyl-2-phenoxy); the compounds wherein dimethylsilyl has been changed to diethyl silyl, diphenyl silyl, or dimethoxy silyl; the compounds wherein titatinum has been changed to zirconium or hafnium; the compounds wherein dichloride has been changed to dibromide, diiodide, bis(dimethylamide), bis (diethylamide), di-n-buthoxide, diisopropoxide, which are transition metal complexes wherein J in the chemical formula [I] is an atom of the group XIV in the Periodic Table of the elements other than the carbon atoms.

Examples of the transition metal complex represented by the general formula [II] include:

μ-oxo bis{isopropylidene(cyclopentadienyl)(2-phenoxy) titanium chloride},

μ-oxo bis{isopropylidene(cyclopentadienyl)(2-phenoxy) titanium methoxide},

μ-oxo bis{isopropylidene(cyclopentadienyl)(3-tert-butyl-5-methyl-2-phenoxy)titanium chloride}, μ-oxo bis{isopropylidene(cyclopentadienyl)(3-tert-butyl-5-methyl-2-phenoxy)titanium methoxide}, μ-oxo bis{isopropylidene(methylcyclopentadienyl)(2-phenoxy)titanium chloride}, μ-oxo bis{isopropylidene(methylcyclopentadienyl(2-phenoxy)titanium methoxide}, μ-oxo bis{isopropylidene(methylcyclopentadienyl)(3-tert-butyl-5-methyl-2-phenoxy)titanium chloride}, μ-oxo bis {isopropylidene(methylcyclopentadienyl)(3-tert-butyl-5-methyl-2-phenoxy)titanium methoxide}, μ-oxo bis{isopropylidene(tetramethylcyclopentadienyl) 2-phenoxy)titanium chloride}, μ-oxo bis{isopropylidene(tetramethylcyclopentadienyl) 2-phenoxy)titanium methoxide}, μ-oxo bis{isopropylidene(tetramethylcyclopentadienyl) (3-tert-butyl-5-methyl-2-phoneoxy)titanium chloride}, μ-oxo bis{isopropylidene(tetramethylcyclopentadienyl) (3-tert-butyl-5-methyl-2-phoneoxy)titanium methoxide}, μ-oxo bis{dimethylsilylene(cyclopentadienyl)(2-phenoxy)titanium chloride}, μ-oxo bis{dimethylsilylene(cyclopentadienyl)(2-phenoxy)titanium methoxide}, μ-oxo bis{dimethylsilylene(cyclopentadienyl)(3-tert-butyl-5-methyl-2-phenoxy)titanium chloride}, μ-oxo bis{dimethylsilylene(cyclopentadienyl)(3-tert-butyl-5-methyl-2-phenoxy)titanium methoxide}, μ-oxo bis{dimethylsilylene(methylcyclopentadienyl)(2-phenoxy)titanium chloride}, μ-oxo bis{dimethylsilylene(methylcyclopentadienyl)(2-phenoxy)titanium methoxide}, μ-oxo bis{dimethylsilylene(methylcyclopentadienyl)(3-tert-butyl-5-methyl-2-phenoxy)titanium chloride}, μ-oxo bis{dimethylsilylene(methylcyclopentadienyl)(3-tert-butyl-5-methyl-2-phenoxy)titanium methoxide};

μ-oxo bis{dimethylsilylene(tetramethylcyclopentadienyl) 2-phenoxy)titanium chloride}, μ-oxo bis{dimethylsilylene(tetramethylcyclopentadienyl) 2-phenoxy)titanium methoxide}, μ-oxo bis{dimethylsilylene(tetramethylcyclopentadienyl) (3-tert-butyl-5-methyl-2-phenoxy)titanium chloride}, and μ-oxo bis{dimethylsilylene(tetramethylcyclopentadienyl) (3-tert-butyl-5-methyl-2-phenoxy)titanium methoxide}.

Examples of the transition metal complex represented by the general formula [III] includes:

di-μ-oxo bis{isopropylidene(cyclopentadienyl)(2-phenoxy)titanium}, di-μ-oxo bis{isopropylidene(cyclopentadienyl)(3-tert-butyl-5-methyl-2-phenoxy)titanium}, di-μ-oxo bis{isopropylidene(methylcyclopentadienyl)(2-phenoxy)titanium}, di-μ-oxo bis{isopropylidene(methylcyclopentadienyl)(3-tert-butyl-5-methyl-2-phenoxy)titanium}, di-μ-oxo bis{isopropylidene(tetramethylcyclopentadienyl)(2-phenoxy)titanium}, di-μ-oxo bis{isopropylidene(tetramethylcyclopentadienyl)(3-tert-butyl-5-methyl-2-phenoxy)titanium}, di-μ-oxo bis{dimethylsilylene(cyclopentadienyl)(2-phenoxy)titanium};

di-μ-oxo bis{dimethylsilylene(cyclopentadienyl)(3-tert-butyl-5-methyl-2-phenoxy)titanium}, di-μ-oxo bis{dimethylsilylene(methylcyclopentadienyl) (2-phenoxy)titanium}, di-μ-oxo bis{dimethylsilylene(methylcyclopentadienyl) (3-tert-butyl-5-methyl-2-phenoxy)titanium}, di-μ-oxo bis{dimethylsilylene(tetramethylcyclopentadienyl)(2-phenoxy)titanium}, and di-μ-oxo bis{dimethylsilylene(tetramethylcyclopentadienyl)(3-tert-butyl-5-methyl-2-phenoxy)titanium}.

The transition metal complex represented by the general formula [I] can be synthesized according to the method described in WO 97/3992.

The transition metal compound represented by trip general formula [II] or [III] can be prepared by reacting a transition metal compound [I] with 1 or 2 equivalent amounts of water or oxygen Examples of the above reaction method include: method of reacting a transition metal compound and necessary amount of water or oxygen directly; a method of charging a transition metal compound into a solvent, such as hydrocarbons, which contains necessary amount of water or oxygen; and a method of charging a transition metal compound into a dry solvent such as hydrocarbons and pass through an inert gas containing necessary amount of water or oxygen.

Next, explanation is given on the aluminum compound (B).

Aluminum compounds (B) are one or more of aluminum compounds selected from the following (B1)–(B3).

(B1) organoaluminum compound represented by the general formula $E^1_a AlZ_{3-a}$, (B2) cyclic aluminoxane represented by the general formula $\{-Al(E^2)-O-\}_b$ and (B3) linear aluminoxane represented by the general formula $E^3\{-Al(E^3)-O-\}_c AlE^3_2$ wherein $E^1$, $E^2$ and $E^3$ respectively represent a hydrocarbon group and all of $E^1$, $E^2$ and $E^3$ may be the same or different; z represents a hydrogen atom or a halogen atom and all of z may be the same or different; a satisfies the following equation $0<a\leq 3$; b represents an integer of 2 or more; and c represents an integer of 1 or more.

As the hydrocarbon group in $E^1$, $E^2$ and $E^3$, a hydrocarbon group having 1–8 carbon atoms 1–8 is preferable, and alkyl group is more preferable.

Specific examples of the organoaluminum compound (B1) represented by the general formula $E^1_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobutylaluminum chloride, dihexylaluminum chloride, etc.; alkylaluminum dichloride such as methylaluminum dichloride, ethylaluminum dichloride, propylaluminum dichloride, isobutylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc.

Among them, trialkylaluminum is preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (B3) having a structure represented by the general formula $E^3\{-Al(E^3)-O-\}_c AlE^3_2$ include alkyl groups such as methyl group, ethyl group, normal propyl group, isopropyl group, normal butyl group, isobutyl group, normal pentyl group, neopentyl group and the like. b is an integer of not less than 2, and c is an integer of not less than 1. $E^2$ and $E^3$ are preferably methyl groups or isobutyl groups, b is preferably 2 to 40 and c is preferably 1 to 40.

The above aluminoxane is produced by various methods. The method is not specifically limited, and the aluminoxane may be produced according to known methods. For example, it is produced by bringing a solution prepared by dissolving a trialkylaluminum (e.g. trimethylaluminum, etc.) in a suitable solvent (e.g. benzene, aliphatic hydrocarbon, etc.) into contact with water. There can also be used a method of bringing a trialkylaluminum (e.g. trimethylaluminum, etc.) into contact with a metal salt containing crystallization water (e.g. copper sulfate hydrate, etc.).

Boron compound (C) is explained as follows:

As the boron compound (C), any one of boron compound (C1) represented by the general formula $BQ^1Q^2Q^3$, boron compound (C2) represented by the general formula $G^+(BQ^1Q^2Q^3Q^4)^-$ and boron compound (C3) represented by the general formula $(L-H)^+(BQ^1Q^2Q^3Q^4)^-$ can be used.

In the boron compound (C1) represented by the general formula $BQ^1Q^2Q^3$, B represents a trivalent boron atom in the valence state; and $Q^1$ to $Q^3$ may be the same or different and represent a halogen atom, a hydrocarbon group, a halogenated hydrocarbon group, a substituted silyl group, a alkoxy group or a disubstituted amino group. $Q^1$ to $Q^3$ represent preferably a halogen atom, a hydrocarbon atom having carbon atoms of 1–20, a halogenated hydrocarbon atom having carbon atoms of 1–20, a substituted silyl group having carbon atoms of 1–20, a alkoxy group having carbon atoms of 1–20 or a disubstituted amino group having carbon atoms of 2–20. $Q^1$ to $Q^3$ represent more preferably a halogen atom, a hydrocarbon group having carbon atoms of 1–20 or a halogenated hydrocarbon group having carbon atoms of 1–20. $Q^1$ to $Q^4$ represent further more preferably a fluorinated hydrocarbon group having carbon atoms of 1–20 and having at least one fluorine atom. $Q^1$ to $Q^4$ represent especially preferably a fluorinated aryl group having carbon atoms of 6–20 and having at least one fluorine atom.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris (pentafluorophenyl)borane is most preferable.

In the boron compound (C2) represented by the general formula $G^+(BQ^1Q^2Q^3Q^4)^-$, $G^+$ represents an inorganic or organic cation; B represents a trivalent boron in the valence state; and $Q^1$ to $Q^4$ are the same as $Q^1$ to $Q^3$ in the above (C1).

In the compound represented by the general formula $G^+(BQ^1Q^2Q^3Q^4)-$, specific examples of $G^+$ as an inorganic cation include ferrocenium cation, alkyl-substituted ferrocenium cation, silver cation, etc. and specific examples of $G^+$ as an organic cation include triphenylmethyl cation, etc. $G^+$ preferably carbenium cation, more preferably triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis(2,3,4-trifluorophenyl)borate, phenyltris(pentafluorophenyl)borate, tetrakis(3,5-bistrifluorophenylmethyl)borate and the like.

Examples of the specific combination of them include ferrocenium tetrakis(pentafluorophenyl)borate, 1,1'-dimethylferrocenium tetrakis(pentafluorophenyl)borate, silver tetrakis(pentafluorophenyl)torate, triphenylmethyl tetrakis(pentafluorophenyl)borate, triphenylmethyl tetrakis (3,5-bistrifluorophenyl)borate and the like. Among them, triphenylmethyl tetrakis(pentafluorophenyl)borate is most preferable.

In the compound (C3) represented by the general formula $(L—H)^+(BQ^1Q^2Q^3Q^4)^-$, L represents a neutral Lewis acid; $(L—H)^+$ represents a Brønsted acid; B represents a trivalent boron in the valence state; and $Q^1$ to $Q^4$ are the same as $Q^1$ to $Q^3$ in the above (C1).

In the compound represented by the general formula $(L—H)^+(BQ^1Q^2Q^3Q^4)^-$, specific examples of $(L—H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same one as that described above.

Examples of the specific combination of them include triethylammonium tetrakis(pentafluorophenyl)borate, tripropylammonium tetrakis(pentafluorophenyl)borate, tri (n-butyl)ammonium tetrakis(pentafluorophenyl)borate, tri (n-butyl)ammonium tetrakis(3,5-bistrifluoromethylphenyl) borate, N,N-dimethylanilium tetrakis(pentafluorophenyl) borate, N,N-diethylanilium tetrakis(pentafluorophenyl) borate, N,N-2,4,6-pentamethylanilium tetrakis (pentafluorophenyl)borate, N,N-dimethylanilium tetrakis(3, 5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl) phosphonium tetrakis(pentafluorophenyl)borate, tri (dimethylphenyl)phosphonium tetrakis(pentafluorophenyl) borate, etc. Among them, tri(n-butyl)ammonium tatrakis (pentafluoro)borate or N,N-dimethylanilinium tetrakis (pentafluorophenyl)borate is most preferable.

In copolymerizing, there is used a catalyst for olefin polymerization comprising the transition metal complex (A) represented by the general formula (I) and above-mentioned compound(s) (B) and/or (C). In case of using a catalyst for olefin polymerization comprising the two components of (A) and (B), preferable compounds (B) are above-mentioned cyclic aluminoxane (B2) and/or the linear aluminoxane (B3). As the other preferable mode of a catalyst for olefin polymerization, there can be given a catalyst for olefin polymerization comprising (A), (B) and (C), wherein said (B1) is preferable.

Each catalyst component is used so that a molar ratio of (B) to (A) is preferably from 0.1 to 10000, more preferably from 5 to 2000, and a molar ratio of (C) to (A) is preferably from 0.1 to 100, more preferably from 0.5 to 10.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from 0.01 to 500 $\mu$mol/g, more preferably from 0.05 to 100 $\mu$mol/g, further preferably from 0.05 to 50 $\mu$mol/g, an amount of (B) is preferably from 0.01 to 10000 $\mu$mol/g, more preferably from 0.1 to 5000 $\mu$mol/g, further preferably from 0.1 to 2000 $\mu$mol/g, in terms of Al atom, and an amount of (C) is preferably from 0.01 to 500 $\mu$mol/g, more preferably from 0.05 to 200 $\mu$mol/g, further preferably from 0.05 to 100 $\mu$mol/g.

The method of producing the propylene copolymer includes solution polymerization using an aliphatic hydrocarbon (e.g. butane, pentane, hexane, heptane, octane, etc.), an aromatic hydrocarbon (e.g. benzene, toluene, etc.) or a halogenated hydrocarbon (e.g. methylene dichloride, etc.) as a solvent, slurry polymerization, and vapor phase polymerization in a gaseous monomer, etc. It is possible to use both continuous polymerization and batch polymerization.

The polymerization temperature is preferably from –50 to 200° C., and more preferably from –20 to 100° C. The polymerization pressure is preferably from normal pressure to 60 kg/cm²G. The polymerization time is generally decided by the kind of the catalyst to be used and reaction apparatus, and can be within the range from 1 minute to 20 hours. Further, in order to regulate the molecular weight of the polymer, a chain transfer agent such as hydrogen may be added.

Intrinsic viscosity [η] of the propylene copolymer of the present invention measured in tetralin solvent at a temperature of 135° C. is preferably 0.3–10, more preferably 0.5–7, further preferably 0.7–5. When the intrinsic viscosity is too low, the resulting thermoplastic resin composition may become poor in flexibility or scratch resistance. When the intrinsic viscosity is too high, flexibility of the resulting thermoplastic resin composition may become poor. Measurement of the intrinsic viscosity [η] is carried out in tetralin at 135° C. by using a UBELODE viscosimeter. The sample is prepared by dissolving 300 mg of copolymer in 100 ml of tetralin to prepare a solution of 3 mg/ml. The said solution is diluted to ½, ⅓, and ⅕, and the respective lots are measured in a constant temperature water bath at 135° C. (±0.1° C.). Measurements are conducted at the respective concentrations for three times in repetition, and the average of resulting values are used.

The propylene copolymer of the present invention has a molecular weight distribution (Mw/Mn) measured by gel permeation chromatography (GPC) of preferably no more than 5, more preferably no more than 4, and further preferably no more than 3. In case the molecular weight distribution is too broad, the flexibility of the resulting thermoplastic resin composition may be inferior when said copolymer is used as a modifying agent. The measurement of molecular weight distribution is carried out by gel permeation chromatography (GPC) (e.g., a 150C/GPC apparatus manufactured by Waters Inc.). The operation is carried out at the elution temperature of 140° C. by using column of, for example, Sodex Packed Column A-80M manufactured by SHOWA DENKO CO., with the molecular weight reference material of polystyrene (e.g., of molecular weight of 68–8,400, 000 manufactured by TOSO CO.). The resulting weight average molecular weight (Mw) converted into the polystyrene, number average molecular weight (Mn), and the ratio of them (Mw/Mn) are used as molecular weight distribution. As the sample for measurement, a polymer of about 5 mg is dissolved in a 5 ml o-dichlorobenzene to a concentration of about 1 mg/ml. The resulting sample solution of 400 μl is injected, at the flow rate of the eluting solvent of 1.0 ml/min., and detection is carried out with a refractive rate detector.

The propylene copolymer of the present invention has preferably an ethylene content of no more than 80 mol. %, more preferably of no more than 75 mol. %, further preferably of no more than 70 mol. %, and especially preferably of no more than 65 mol. %. When the content is too high, the propylene copolymer may contain the crystals derived from ethylene, which may lead to degradation of flexibility of the resulting thermoplastic resin composition.

The propylene copolymer of the present invention may be used as a modifying agent for polyolefin resin. When the resulting thermoplastic resin composition is used for the purposes which requireflexibility, transparency, and scratch resistance, etc., e.g., as the substitution material for soft polyvinyl chloride, it is desirable that the composition of the propylene copolymer satisfies the following equation:

$[y/(100-x)] \geq 0.45$ more preferably, $[y/(100-x)] \geq 0.47$ further preferably, $[y/(100-x)] \geq 0.50$.

When the composition is out of the above range, the resulting thermoplastic resin composition may have poor flexibility, transparency, and scratch resistance. In the above equations, x shows the mole content of the propylene in the copolymer, and y shows the total of the mole contents of the α-olefin having carbon atoms of 4–20 in the copolymer.

The propylene copolymer of the present invention may be used as a modifying agent for polyolefin resin. When the resulting thermoplastic resin composition is used for the purposes for which flexibility is required, e.g., as the substitution material for soft polyvinyl chloride, it is desirable that the composition has not either the peak of more than 1 J/g based on the crystal melting or peak of more than 1 j/g based on the crystallization when determined with a differential scanning calorimeter (DSC). When the propylene copolymer has such a peak, the resulting thermoplastic resin composition may become poor inflexibility. As the DSC, there may be used, for example, DSC220C manufactured by SEIKO Electronics Co., with which measurements are performed at the rate of 10° C./min. for both the temperature elevation and the constant temperature processes.

The propylene copolymer of the present invention may be used as a modifying agent for polyolefin resin. When the resulting thermoplastic resin composition is used for the purposes which require flexibility, e.g., as the substitution material for soft polyvinyl chloride, it is desirable for the propylene copolymer to be such that the flexural modulus (S) of homopolypropylene and the added weight % (T) of homopolypropylene and the flexural modulus (U) of the resulting thermoplastic resin composition are in the following relations:

$U \leq S \times [(T/100) \times V]^2$

In this case, V is preferably 1.1, more preferably 1.0, further preferably 0.9, and particularly preferably 0.8. When the data is outside the above range, the resulting thermoplastic resin composition may have inferiorflexibility.

The propylene copolymer of the present invention may be used as a modifier agent for polyolefin resin. When the resulting thermoplastic resin composition is used for the purposes which requireflexibility, e.g., as the substitution material for soft polyvinyl chloride, it is desirable for the arrangement of the propylene and/or α-olefin side chains to be of atactic structure. The cases of the orientation of the arrangement of the propylene and/or α-olefin side chains to be of atactic structure denote the case where the orientation of the side chains of the propylene chains in the copolymer is of atactic structure, the case where the orientation of the side chains of C4–20 α-olefin chains in the copolymer is of atactic structure, and the case where the orientation of the side chains of propylene/C4–20 α-olefin compound chains in the copolymer is of atactic structure. The atactic structure of the propylene copolymer of the present invention can be confirmed from the fact that, for example the polymerization of a homopolypropylene by using a transition metal complex used for the polymerization of the propylene copolymer of the present invention, the resulting homopolypropylene has a structure wherein the amount of F(1) defined by the following formula using the intensity [mm], [mr] and [rr] of the respective signals attributed to the mm, mr and rr of the propylene methyl carbon determined from the $^{13}$CNMR spectrum is between 40 and 60, preferably between 43 and 57, more preferably between 45 and 55.

$F(1)=100 \times [mr]/([mm]+[mr]+[rr])$

In the same manner, with respect to the propylene copolymer of the present invention, the atactic structure can to confirmed by the fact that the amount corresponding to F(1) which is obtained by using the intensities of the respective signals attributed to mm, mr and rr of propylene methyl carbon, branched methylene carbon of α-olefin, branched terminal methyl carbon of α-olefin, etc. lies within the above range. In case the propylene copolymer has no atactic structure, the resulting thermoplastic resin composition may have inferior flexibility. The attributes of mm, mr, rr signals such as propylene methyl carbon, branched methylene carbon of α-olefin, branched terminal methyl carbon of α-olefin, etc. may be available by referencing, for example, T. Asakura, Macromolecules, Vol. 24, p. 2334 (1991), New Edition Polymer Analysis Handbook (1995) published by Kinokunia Bookstore, etc.

When the propylene copolymer of the present invention is used as a modifying material for polyolefin resin, and the resulting thermoplastic resin composition is used for the purpose for which stiffness, impact resistance, and balance between stiffness and impact resistance, etc. are required, e.g., for the automobile outer furnishing parts such as bumper, mole, front grill, instrument panel, or for the outer furnishing parts for electric apparatuses, it is desirable for the composition of the propylene copolymer to satisfy the following equation.

$[y/(100-x)]<0.45$

In the above equation, x represents a mole content of propylene in the copolymer, and y represents the total of the mole contents of α-olefins having carbon atoms of 4–20 in the copolymer.

The propylene content of the propylene copolymer of the present invention is preferably less than 90 mol. %, more preferably less than 80 mol. %, further preferably less than 70 mol. %, especially preferably less than 60 mol. %, most preferably less than 50 mol. % when the low temperature resistance is particularly required. When the content is out of said range, the propylene copolymer and the resulting thermoplastic resin composition may have poor low temperature impact resistance.

The α-olefin content of the propylene copolymer of the present invention is preferably more than 10 mol. %, more preferably more than 15 mol. %, further preferably more than 20 mol. %, and especially preferably more than 25 mol. % when the low temperature resistance is particularly required. When the content is out of said range, the resulting thermoplastic resin composition may have poor low temperature impact resistance.

In the propylene copolymer of the present invention, the α-olefin has carbon atoms of 4 to 20, and α-olefin is preferably 1-butene, 1-hexene, 1-octene or 1-decene.

The propylene copolymer of the present invention is preferably used as a polyolefin resin modifier. The polyolefin resin includes high density polyethylene, medium density polyethylene, low density polyethylene, LLDPE (straight chain low density polyethylene), polypropylene resin, poly-4-methyl-penten-1, etc., and polypropylene resin is preferable.

The thermoplastic resin composition of the present invention is the thermoplastic resin containing 3 to 95% by weight of propylene copolymer and 97 to 5% by weight of polyolefin resin.

Examples of the polyolefin resin are high density polyethylene, medium density polyethylene, low density polyethylene, LLDPE (straight chain low density polyethylene), polypropylene resin, poly-4-methyl-penten-1, and the like. Polypropylene resin is preferable.

The polypropylene resin to be used for the thermoplastic resin composition of the present invention is a crystalline polypropylene resin, and is a homopolymer of propylene or a random or block copolymer of propylene with a small amount of α-olefin having carbon atoms 2 or 4–12. In case said polypropylene resin is a random copolymer, the copolymerization ratio of α-olefin having carbon atoms 2 or 4–12 in said copolymer is in general no more than 10% by weight, preferably 0.5 to 7% by weight. In case said propylene resin is a block copolymer, the copolymerizat ion ratio of α-olefin in said copolymer is in general 1 to 40% by weight, preferably 1 to 25% by weight, more preferably 2 to 20% by weight, and especially preferably 3 to 15% by weight. These polypropylene polymers may contain two or more polymers. As the indices for the crystallinity of the polypropylene, there are used, for example, melting point, crystal melting calorie, etc. It is preferable that the melting point is in the range of 120–176° C. and the crystal melting calorie in the range of 60 J/g–120 J/g. When the melting point of the crystal or melting calorie is too low, heat resistance of the composition may become poor .

With respect to the method for producing a polypropylene resin there can be given a method for producing a propylene homopolymer by slurry polymerization, gas phase polymerization, bulk polymerization, solution polymerization or polymerization of their combination, in a single stage or multistage, by using a Ziegler-Natta catalyst used by combining a so-called titanium-containing solid transition metal component with an organic metal component, or a metalocene catalyst comprising a transition metal compound of Periodic Table IV-A–VI-A having at least one cyclopentadienyl skeleton and an auxiliary catalyst component, or a method for producing a propylene/α-olefin copolymer by copolymerizing propylene with α-olefin having carbon atoms of 2 or 4–12, preferably ethylene, in a single stage or multistage. The commercially available corresponding product may be used.

The thermoplastic resin composition of the present invention contains 3–95% by weight of propylene copolymer (A) and 97–5% by weight of polyolefin resin (B) [(A)+(B)= 100% by weight]. The composition is preferably 10–80% by weight of olefin copolymer and 90–20% by weight of polyolefin resin, more preferably 30–70% by weight of olefin copolymer and 70–30% by weight of polyolefin resin When the olefin copolymer is used in excessively large amount (polyolefin resin is excessively small amount), there may be lowering of liquidity, inferiority of molding processing property, shortage of strength, inferiority of heat resistance, etc., while on the other hand, when the olefin copolymer content is excessively small (polyolefin resin is excessively large), the product may have inferior flexibility or poor scratch resistance.

When the propylene copolymer of the present invention is used as a modifying material for polyolefin resin, and when the resulting thermoplastic resin composition is used for the purpose for which stiffness, impact resistance, and balance between stiffness and impact resistance, etc. are required, e.g., for the automobile outer furnishing parts such as bumper, mole, front grill, instrument panel, or for the outer furnishing parts for electric apparatuses, it is desirable for the composition of the propylene copolymer to satisfy the following equation.

$$[y/(100-x)]<0.45$$

In the above equation, x represents a mole content of propylene in the copolymer, and y represents the total of the mole contents of α-olefins having carbon atoms of 4–20 in the copolymer. In case the flexibility of the thermoplastic resin composition is specially required, it is desirable for the copolymer to contain 30–95% by weight of propylene copolymer (A) and 70–5% by weight of polyolefin resin (B) [(A)+(B)=100% by weight], preferably 40–90% by weight of propylene copolymer and 60–10% by weight of polyolefin resin, more preferably 50–85% by weight of propylene copolymer and 50–15% by weight of polyolefin resin, Particular preferably 60–80% by weight of propylene copolymer and 40–20% by weight of polyolefin resin. When the propylene copolymer is used in excessively large amount (polyolefin resin is excessively small amount), there may be lowering of liquidity, inferiority of molding processing property, shortage of strength, inferiority of heat resistance, etc. On the other hand, when the propylene copolymer content is excessively small (polyolefin resin is excessively large), the product may have inferior elasticity and the like.

The other rubber components may be optionally added to thermoplastic resin composition containing a propylene copolymer of the present invention in addition to the essential components of propylene copolymer and polyolefin resin. Examples of said the other rubber components include ethylene-propylene copolymer rubber, ethylene-propylene-non-conjugated diene copolymer rubber, ethylene-1-butene copolymer rubber, polybutadiene, styrene-butadiene block copolymer rubber, styrene-butadiene-styrene block copolymer rubber, styrene-butadiene random copolymer rubber, partially hydrogenated styrene-butadiene-styrene block copolymer rubber, partially hydrogenated styrene-butadiene random copolymer rubber, styrene-isoprene block copolymer rubber, partially hydrogenated styrene-isoprene block copolymer rubber, acrylonitrile-butadiene copolymer rubber, partially hydrogenated acrylonitrile-butadiene copolymer rubber, butyl rubber, chloroprene rubber, fluorine rubber, chlorosulfonated polyethylene, silicon rubber, urethane rubber, etc. Further, if necessary, a crosslinking reaction may be carried out by addition of peroxide. Furthermore, if necessary, antioxidant, thermal stabilizer, ultraviolet absorbing agent, lubricant, antistatic agent, pigment, filler, flame retardant, etc. may be added The other resin components may be optionally added to thermoplastic resin composition containing a propylene copolymer of the present invention in addition to the essential components of propylene copolymer and polyolefin resin. Said the other resin components include rosin resin, polyterpene resin, synthetic petroleum resin, chroman resin, phenol resin, xylene resin, styrene resin and isoprene resin, cyclic olefin resin, etc.

As a method for producing a thermoplastic resin composition containing the propylene copolymer of the present invention, there can be given a method of melt-kneading each component with a biaxial extruder, banbury mixer, and the like.

The thermoplastic resin composition containing the propylene copolymer of the present invention can be formed by known methods such as extrusion molding, injection molding, compression molding, blow molding, vacuum molding, powder molding, calender molding, etc. The powder molding method includes, for example, slush molding, flow dipping, static coating, powder flame coating, powder rotary forming, etc.

The thermoplastic resin composition containing propylene copolymer of the present invention can be most suitably used for the home electronic products, automobile parts, haberdashery, etc. by utilizing its excellent characteristics. For automobile parts, the composition can be suitably used for the internal furnishing covers such as instrument panel, door, pillar, air-bag cover, etc.

As described above, according to the present invention, it has been possible to provide an improved thermoplastic resin composition having excellent flexibility and transparency and scratch resistance when mixed with a polyolefin resin such as polypropylene; use of the propylene copolymer as a polyolefin resin modifier; and a thermoplastic resin composition containing the propylene copolymer and polyolefin resin. The present copolymer is described in Japanese patent application 09-186365 filed Jul. 11, 1997, the complete disclosure of which is incorporated herein by reference.

EXAMPLES

The present invention will be more specifically illustrated by way of the following examples, which however are for explication, and not to be construed to limit the present invention.

[1] Measurement Methods

The measurements were conducted in the following manner.

(1) Intrinsic Viscosity [η]

The intrinsic viscosity was measured in tetralin at 135° C. using an Ubbelohde viscometer. A sample (300 mg) was dissolved in 100 ml tetralin to prepare a solution of 3 mg/ml. Further, the said solution was diluted to ½, ⅓, and ⅕, and they were respectively measured in a constant temperature oil bath at 135° C. (±0.1° C.). Measurements were conducted repeatedly for 3 times at the respective concentrations, and the average of resulting valued was used.

(2) Measurement with Differential Scanning Calorimeter (DSC)

By using a differential scanning calorimeter (DSC 220C manufactured by SEIKO Electronics Industry Co.) measurements were conducted on both temperature elevation and temperature decrease steps at the rate of 10° C./min.

(3) Measurement of Molecular Weight Distribution

It was determined by gel permeation chromatography (GPC)(150C/GPC), manufactured by Waters Co.) The elution temperature was 140° C., and the column used was Sodex Packed Column A-80M manufactured by SHOWA DENKO Co., and the molecular weight reference material was polystyrene (molecular weight 68–8,400,000 manufactured by TOSO Co.). The resulting weight average molecular weight (Mw), number average molecular weight (Mn), and the ratio of them (Mw/Mn) converted into the polystyrene were used as molecular weight distribution. As the sample for measurement, a polymer of about 5 mg was dissolved in a 5 ml o-dichlorobenzene to a concentration of about 1 mg/ml. The resulting sample solution of 400 μl was injected, at the flow rate of the eluting solvent of 1.0 ml/min., and detection was made with a refractive rate detector.

(4) Measurement of Respective Monomer unit Content in Copolymer

With respect to the measurements of the respective monomer unit content in the propylene copolymer, calculation was carried out according to the following method from the results of measurements with an infrared spectrophotometer.

(a) Preparation of Calibration Curve

Mixtures of various mixing ratios of propylene homopolymer and ethylene-1-butene copolymer were respectively heat pressed to form into films of 0.05 mm thick. Using an infrared spectrometer, there were obtained the absorbances of the peak derived from propylene unit (wave number 1150 cm$^{-1}$) and the peak derived from 1-butene unit (wave number 770 cm$^{-1}$). The unit contents of propylene and 1-butene in said mixtures were plotted to the obtained absorbances,. From these plots, the regression straight lines were obtained to make calibration curves. With respect to the mixture of the propylene homopolymer and the ethylene-1-butene copolymer, they were dissolved in toluene and added methanol, and the resulting precipitate was dried for use.

(b) Measurement of Propylene/1-butene Content

An olefin copolymer was heat pressed to form into a film of 0.05 mm thick. Next, absorbances of the peak derived from the propylene unit and the peak derived from the 1-butene unit were obtained by using an infrared spectrograph. From the calibration curves obtained from the above method, the unit contents of propylene and 1-butene in the olefin copolymer were calculated.

[II] Preparation of Catalyst for Polymerization (1) Synthesis of Transition Metal Complex (dimethylsilyl (tetramethyl cyclopentadienyl)(3-tert-butyl-5-methyl-2-phenoxy)titanium dichloride)

(a) Synthesis of 1-bromo-3-tert-butyl-5-methyl-2-phenol

Under nitrogen atmosphere, in a 500 ml four-necked flask equipped with a stirrer, 20.1 g (123 mmol) of 2-tert-butyl-4-methyl phenol was dissolved in 150 ml of toluene, to which 25.9 ml (18.0 g, 246 mmol) of tert-butylamine was added. To the resulting solution cooled to −70° C., 10.5 ml (32.6 g, 204 mol) of bromine was added. The solution was kept to −70° C., and stirred for 2 hours. Thereafter, the solution was subjected to elevated temperature to room temperature, to which 100 ml of 10% dilute hydrochloric acid was added at a time and the solution was washed for 3 times. After washing, the resulting organic layer was dried with anhydrous sodium sulfate, the solvent was removed with an evaporator, and the resulting product was purified with a silica gel column to give 1-bromo-3-tert-butyl-5-methyl-2-phenyl (18.4 g, 75.7 mmol) as colorless oil. Yield, 62%.

(b) Synthesis of 1-bromo-3-tert-butyl-2-methoxy-5-methyl benzene

Under nitrogen atmosphere, in a 100 ml four-necked flask equipped with a stirrer, 13.9 g (57.2 mmol) of 1-bromo-3-tert-butyl-5-methyl-2-phenol synthesized in above (1) was dissolved in 40 ml of acetonitrile, to which 3.8 g (67.9 mmol) of potassium hydroxide was added. Further, 17.8 ml (40.6 g, 286 mmol) of methyl iodide was added, and the mixture was continuously stirred for 12 hours. Thereafter, the solvent was removed with an evaporator, and 40 ml of hexane was added to the residue to extract the hexane-soluble contents. The extraction was repeated for 3 times. The solvent was removed from the extract to give 1-bromo-3-tert-butyl-2-methoxy-5-methyl benzene as pale yellow oil (13.8 g, 53.7 mmol). Yield, 94%.

(c) Synthesis of (3-tert-butyl-2-methoxy-5-methylphenyl) chlorodimethyl silane

To a solution comprising tetrahydrofuran (31.5 ml), hexane (139 ml) and 1-bromo-3-tert-butyl-2-methoxy-5-methyl benzene (45 g) synthesized in above (2), a solution of 1.6 mol/liter of n-butyl lithium in hexane (115 ml) was added dropwise at −40° C. in 20 minutes. The resulting mixture was kept at the temperature of −40° C. for 1 hour, after which tetrahydrofuran (31.5 ml) was added dropwise.

To a solution comprising dichloromethyl silane (131 g) and hexane (306 ml), the mixture obtained above was added dropwise at −40° C. The resulting mixture was subjected to temperature rise to room temperature in 2 hours, and further stirred at room temperature for 12 hours.

From the reaction mixture, the solvent and the excessive dichlorodimethyl silane were distilled under reduced pressure, the hexane-soluble portion was extracted from the residue by using hexane, and the solvent was distilled from the resulting hexane solution to give 41.9 g of (3-tert-butyl-2-methoxy-5-methylphenyl)chlorodimethyl silane in pale yellow oil. Yield, 84%.

(d) Synthesis of (3-tert-butyl-2-methoxy-5-methylphenyl) dimethyl(tetramethyl cyclopentadienyl)silane To the solution comprising (3-tert-butyl-2-methoxy-5-methylphenyl)chlorodimethyl silane (5.24 g) synthesized in above (c) and tetrahydrofuran (50 ml), tetramethyl cyclopentadienyl lithium (2.73 g) was added at −35° C. The mixture was subjected to temperature elevation to room temperature in 2 hours, and further stirred at room temperature for 10 hours.

The solvent was distilled under reduced pressure from the resulting reaction mixture, the hexane-soluble portion was extracted from the residue by using hexane, and the solvent was distilled from the resulting hexane solution to give 6.69 g of (3-tert-butyl-2-methoxy-5-methylphenyl)dimethyl (tetramethyl cyclopentadienyl) silane in pale yellow oil. Yield, 97%.

(e) Synthesis of dimethylsilyl(tetramethyl cyclopentadienyl)(3-tert-butyl-5-methyl-2-phenoxy) titanium dichloride To the solution comprising (3-tert-butyl-2-methoxy-5-methylphenyl)dimethyl(tetramethyl cyclopentadienyl) silane(10.04 g)synthesized in above (d), toluene(100 ml), and triethylamine(6.30 g),1.63 mol/liter of n-butyl lithium in hexane solution (19.0 ml) was added dropwise at −70° C. The mixture was subjected to temperature elevation to room temperature in 2 hours, and further stirred at room temperature for 12 hours.

The mixture obtained in the above step was added dropwise to the solution of titanium tetrachloride (4.82 g) in toluene (50 ml) under nitrogen atmosphere at 0° C., and thereafter the temperature was raised to room temperature in 1 hour, and then the reaction mixture was refluxed under heating for 10 hours.

The reaction mixture was filtered to remove solvent from the filtrate, and the residue was re-crystallized from the toluene-hexane mixed solvent to obtain orange colored columnar crystal of dimethylsilyl(tetramethyl cyclopentadienyl)(3-tert-butyl-5-methyl-2-phenoxy) titanium dichloride (3.46 g). Yield, 27%.

The spectral data were as follows:
1H-NMR (CDCl$_3$) δ 0.57 (s, 6H), 1.41 (s, 9H), 2.15 (s, 6H), 2.34 (s, 6H), 2.38 (s, 3H), 7.15 (s, 1H), 7.18 (s, 1H); 13C-NMR (CDCl$_3$) δ 1.25, 14.48, 16.28, 22.47, 31.25, 36.29, 120.23, 130.62, 131.47, 133.86, 135.50, 137.37, 140.82, 142.28, 167.74; Mass spectra (CI, m/e) 458; (Formula).

[III] Polymerization of Propylene Copolymer

Example 1

A 2 L separable flask reactor equipped with a stirrer, a thermometer, a dropping funnel and a reflux cooling tube was subjected to reduced pressure and the atmosphere was replaced with nitrogen gas. To the flask 1 L of dry toluene was introduced as a polymerization solvent. Ethylene (2 NL/min.), propylene (4 NL/min.), and 1-butene (1 NL/min.) were continuously fed at normal pressure, and the solvent temperature was kept at 30° C. After adding 0.75 mmol of triisobutylaluminum (hereinafter to be abbreviated as TIBA) to the polymerization bath, 0.0015 mmol of dimethylsilyl (tetramethylcyclopentadienyl)(3-tert-butyl-5-methyl-2-phenoxy)titanium dichloride was charged as a polymerization catalyst in the polymerization bath. Fifteen seconds thereafter, 0.0075 mmol of triphenylmethyltetrakis (pentafluorophenyl)borate was added to the polymerization bath, and polymerization was started. As a result of the polymerization for 10 minutes, 86.4 g of propylene-1-buten-ethylene copolymer was obtained.

Examples 2–7

Except for changing the monomer addition amount and the catalyst addition amount as shown in Table 1 to 3, the operation was conducted in the same manner as that described in Example 1 to obtain a copolymer. Results are shown in Tables 1 to 3.

Reference Example 1

A 2 L separable flask reactor equipped with a stirrer, a thermometer, a dropping funnel and a reflux cooling tube was subjected to reduced pressure and the atmosphere was replaced with nitrogen gas. To the flask 1 L of dry toluene was introduced as a polymerization solvent. Propylene (8 NL/min.) was continuously fed at normal pressure, and the solvent temperature was kept at 30° C. After adding 1.25 mmol of TIBA to the polymerization bath, 0.005 mmol of dimethylsilyl(tetramethylcyclopentadienyl)( 3-tert-butyl-5-methyl-2-phenoxy)titanium dichloride was charged as a polymerization catalyst in the polymerization bath. Fifteen seconds thereafter, 0.025 mmol of triphenylmethyltetrakis (pentafluorophenyl)borate was added to the polymerization bath, and polymerization was started. As a result of the polymerization for 10 minutes, 65.6 g of homopolypropylene was obtained. The resulting homopolypropylene had the signal intensities [mm], [mr] and [rr] belonging to mm, mr and rr of propylene methyl carbon which could be determined by $^{13}$CNMR spectrum in the intensity ratios of 17:51:32, respectively. The F(1) amount defined by the following equation using these numerical values was 51, and the resulting homopolypropylene was identified to be of atactic structure.

$$F(1)=100\times[mr]/([mm]+[mr]+[rr])$$

[IV] Evaluation of Thermoplastic Resin Composition

The compositions as shown in Tables 4 to 6 were subjected to preliminary kneading with Plasticoder PLV151 manufactured by Blabender Co. at a temperature of 200° C., at a screw revolution of 10 rpm for 2 minutes, followed by kneading at 80 rpm for 10 minutes. The said composition was pressed at 200° C. to form a sheet having a thickness of 2 mm. For physical property test, the test piece was punched out from the press sheet and offered for measurement.

Various properties of the propylene copolymer compositions in examples and comparative examples were measured by the following methods:

(1) Hardness: ASTM D2240

(2) Flexural modulus: JIS K7203

(3) Scratch resistance test: By using a surface property measuring apparatus TRIBOGEAR (manufactured by SHINTO KAGAKU Co.) carrying a 500 g load thereon, a specimen of 2 mm thick press sheet was provided with damage by scratching at a predetermined speed. The depth of the damage was measured with a contact type surface roughness gauge, SURFCOM (manufactured by SHINTO KAGAKU Co.) in a measure of $\mu$m order.

(4) Haze: JIS K7105 Measurement was performed on a 2 mm thick press sheet.

(5) Differential scanning calorimeter (DSC): By using a differential scanning calorimeter (DSC 220C manufactured by SEIKO ELECTRONICS KOGYOSHA), measurements were carried out at a rate of 10° C./min. in both the temperature elevation and constant temperature steps.

TABLE 1

|  |  | Example 1<br>A-1<br>EPB | Example 2<br>A-2<br>EPB | Example 3<br>A-3<br>EPB |
|---|---|---|---|---|
| Polymerization temperature | ° C. | 30 | 30 | 30 |
| Polymerization time | min | 10 | 40 | 10 |
| Ethylene | NL/min | 2.0 | 0.5 | 2.0 |
| Propylene | NL/min | 4.0 | 8.0 | 2.0 |
| 1-Butene | NL/min | 1.0 | 1.0 | 1.0 |
| *1 (a) | mmol | 0.75 | 0.25 | 0.75 |
| *2 (b) | mmol | 0.0075 | 0.00025 | 0.0075 |
| *3 (c) | mmol | 0.0015 | 0.00025 | 0.0015 |
| Ethylene content | mol % | 10 | 4 | 17 |
| Propylene content | mol % | 53 | 69 | 36 |
| 1-Butene content | mol % | 37 | 27 | 48 |
| Crystal melting point | ° C. | None | None | None |
| Crystal melting calorie | mj/mg | None | None | None |
| Crystallization temperature | ° C. | None | None | None |
| Crystallization calorie | mj/mg | None | None | None |

TABLE 1-continued

|  |  | Example 1<br>A-1<br>EPB | Example 2<br>A-2<br>EPB | Example 3<br>A-3<br>EPB |
|---|---|---|---|---|
| Intrinsic viscosity [η] | dl/g | 0.88 | 1.35 | 0.83 |
| GPC Mw/Mn |  | 1.9 | 1.9 | 2.1 |

TABLE 2

|  |  | Example 4<br>A-4<br>EPB | Example 5<br>A-5<br>EPB | Example 6<br>A-6<br>EPB | Example 7<br>A-7<br>EPB |
|---|---|---|---|---|---|
| Polymerization temperature | ° C. | 30 | 30 | 30 | 30 |
| Polymerization time | min | 10 | 20 | 10 | 10 |
| Ethylene | NL/min | 8.0 | 8.0 | 8.0 | 8.0 |
| Propylene | NL/min | 4.0 | 2.0 | 2.0 | 1.0 |
| 1-Butene | NL/min | 1.0 | 0.2 | 1.0 | 1.0 |
| *1 (a) | mmol | 0.75 | 0.25 | 0.75 | 0.75 |
| *2 (b) | mmol | 0.0075 | 0.00025 | 0.0075 | 0.0075 |
| *3 (c) | mmol | 0.0015 | 0.0001 | 0.0015 | 0.0015 |
| Ethylene content | mol % | 41 | 57 | 48 | 51 |
| Propylene content | mol % | 30 | 26 | 17 | 9 |
| 1-Butene content | mol % | 29 | 17 | 36 | 40 |
| Crystal melting point | ° C. | None | None | None | None |
| Crystal melting calorie | mj/mg | None | None | None | None |
| Crystallization temperature | ° C. | None | None | None | None |
| Crystallization calorie | mj/mg | None | None | None | None |
| Intrinsic viscosity [η] | dl/g | 1.34 | 3.41 | 1.43 | 1.45 |
| GPC Mw/Mn |  | 2.1 | 2.0 | 2.2 | 2.1 |

TABLE 3

|  |  | Comparative example 1<br>A-8<br>EPB | Comparative example 2<br>A-9<br>EPB |
|---|---|---|---|
| Polymerization temperature | ° C. | 30 | — |
| Polymerization time | min | 10 | — |
| Ethylene | NL/min | 1.0 | — |
| Propylene | NL/min | 8.0 | — |
| 1-Butene | NL/min | 1.0 | — |
| *1 (a) | mmol | 2.5 | — |
| *2 (b) | mmol | 0.05 | — |
| *3 (c) | mmol | — | — |
| *4 (d) | mmol | 0.01 | — |
| Ethylene content | mol % | 16 | 20 |
| Propylene content | mol % | 63 | 27 |
| 1-Butene content | mol % | 21 | 53 |
| Crystal melting point | ° C. | 50.1 | 56.1 |
| Crystal melting calorie | mj/mg | 36.7 | 31.9 |
| Crystallization temperature | ° C. | — | — |
| Crystallization calorie | mj/mg | — | — |

TABLE 3-continued

|  | | Comparative example 1 A-8 EPB | Comparative example 2 A-9 EPB |
|---|---|---|---|
| Intrinsic viscosity [η] | dl/g | 1.01 | 0.44 |
| GPC Mw/Mn | | 2.2 | 9.1 |

A-10: Ethylene-propylene-1-butene copolymer VESTOPLAST 520 (manufactured by Huls Co.)
*1 (a): Triisobutyl aluminum
*2 (b): Triphenylmethyl tetrakis(pentafluorophenyl)borate
*3 (c): Dimethylsilyl(tetramethyl cyclopentadienyl) (3-tert-butyl-5-methyl-2-phenoxy(titanium) dichloride
*4 (d): Ethylene bis(idenyl)hafnium dichloride

TABLE 4

| Copolymer | Unit | Example 8 | Example 9 | Example 10 |
|---|---|---|---|---|
| A-1 | WT % | 50 | | |
| A-2 | | | 50 | |
| A-3 | | | | 50 |
| B-1 | WT % | 50 | 50 | 50 |
| Hardness | | | | |
| Shore A | | 87 | 91 | 91 |
| Shore D | | 42 | 47 | 40 |
| Flexural modulus | Kgf/cm$^2$ | 990 | 1190 | 970 |
| Scratch depth (500 g load) | Kgf/cm$^2$ | 49 | 25 | 48 |
| Haze (2 mmt) | % | 67 | 69 | 71 |

TABLE 5

| Copolymer | Unit | Example 11 | Example 12 | Example 13 | Example 14 |
|---|---|---|---|---|---|
| A-4 | WT % | 50 | | | |
| A-5 | | | 50 | | |
| A-6 | | | | 50 | |
| A-7 | | | | | 50 |
| B-1 | WT % | 50 | 50 | 50 | 50 |
| Hardness | | | | | |
| Shore A | | 93 | 96 | 93 | 95 |
| Shore D | | 45 | 48 | 48 | 47 |
| Flexural modulus | Kgf/cm$^2$ | 2640 | 2890 | 3300 | 3100 |
| Scratch depth (500 g load) | Kgf/cm$^2$ | 114 | 98 | 126 | 119 |
| Haze (2 mmt) | % | 97 | 97 | 97 | 97 |

TABLE 6

| Copolymer | Unit | Comparative example 3 | Comparative example 4 | Comparative example 5 |
|---|---|---|---|---|
| A-8 | WT % | 50 | | |
| A-9 | | | 50 | |
| B-1 | WT % | 50 | 50 | 100 |
| Hardness | | | | |
| Shore A | | 92 | 87 | 95 |
| Shore D | | 56 | 49 | 72 |
| Flexural modulus | Kgf/cm$^2$ | 3200 | 2760 | 13340 |
| Scratch depth (500 g load) | Kgf/cm$^2$ | 49 | 84 | |
| Haze (2 mmt) | % | 88 | 70 | 83 |

B-1: homopropylene; 230° C. MI = 14(g/10 minutes) under a load of 2.16 kg

What is claimed is:

1. A propylene copolymer obtained by polymerizing a propylene, one or more of α-olefin having 4–20 carbon atoms, and ethylene, under effective polymerization conditions in the presence of a catalyst for olefin polymerization comprising (A) and (B), (A) and (C), or (A), (B) and (C):

(A): at least on transition metal complex represented by the following formula [I], [II] or [III]:

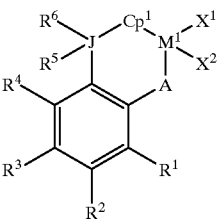

[I]

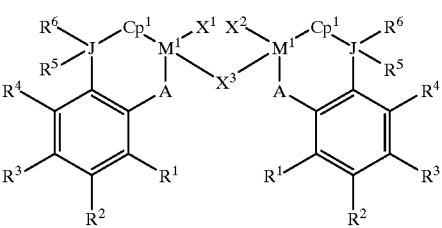

[II]

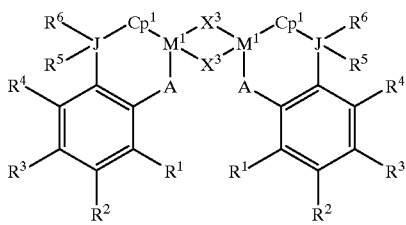

[III]

wherein M¹ represents a transition metal atom of the group IV in the Periodic Table of the Elements; A represents an atom of the group XVI in the Periodic Table of the Elements; J represents an atom of the group XIV in the Periodic Table of the Elements; Cp¹ represents a group having a cyclopentadiene type anion skeleton; $X^1$, $X^2$, $R^1$, $R^2$, $R^3$, $R^4$, $R^5$ and $R^6$ independently represent a hydrogen atom, halogen atom, an alkyl group, an aralkyl group, an aryl group, a substituted silyl group, an alkoxy group, an aralkyloxy group, an aryloxy group or a disubsutited amino group; and $R^1$, $R^2$, $R^3$, $R^4$, $R^5$ and $R^6$ may be combined optionally to form a ring, $X^3$ represents an atom of the groups XVI in the Periodic Table of the Elements; and two of $M^1$, A, J, $Cp^1$, $X^1$, $X^2$, $X^3$, $R^1$, $R^2$, $R^3$, $R^4$, $R^5$ and $R^6$ may be the same or different;

(B) one or more aluminum compounds selected from the following (B1)–(B3):
(B1) an organoaluminum compound represented by the general formula $E^1_a AlZ_{3-a}$,
(B2) a cyclic aluminoxane represented by the general formula $\{-Al(E^2)-O-\}_b$ and
(B3) a linear aluminoxane represented by the general formula $E^3\{-Al(E^3)-O-\}_c AlE^3_2$ wherein $E^1$, $E^2$ and $E^3$ respectively represent a hydrocarbon group and all of $E^1$, $E^2$ and $E^3$ may be the same or different; Z represents a hydrogen atom or a halogen atom and all of Z may be the same or different; a satisfies the following equation $0<a\leq 3$; b represents an integer of 2 or more; and c represents an integer of 1 or more;

(C) any one of the boron compounds of the following (C1)–(C3):
(C1) a boron compound represented by the general formula $BQ^1Q^2Q^3$,
(C2) a boron compound represented by the general formula $G^+(BQ^1Q^2Q^3A^4)^-$ and
(C3) a boron compound represented by the general formula $(L-H)^+(BQ^1Q^2Q^3A^4)^-$ wherein B represents a trivalent boron atom in the valence state; and $Q^1$ to $Q^4$ may be the same or different and represent a halogen atom, a hydrocarbon group, a halogenated hydrocarbon group, a substituted silyl group, an alkoxy group or a disubstituted amino group; G+ is an inorganic or organic cation; L is a neutral Lewis base; and (L—H) x is a Bronsted acid.

2. The propylene copolymer according to claim 1, wherein A in the formula [I], [II] or [III], is an oxygen atom.

3. The propylene copolymer according to claim 1, wherein $R^1$ in the formula [I], [II] or [III] is an alkyl group, an aralkyl group, an aryl group or a substituted silyl group.

4. The propylene copolymer according to claim 1, wherein $X^1$ and $X^2$ in the formula [I], [II], [III] are independently a halogen atom, an alkyl group, an aralkyl group, an alkoxy group, an aryloxy group, or disubstituted amino group.

5. The propylene copolymer according to claim 1, wherein the compound (B) is a triethyl aluminum, a triisobutyl aluminum or a methyl aluminoxane.

6. The propylene copolymer according to claim 1, wherein the compound (C) is a dimethylanilinium tetrakis (pentafluorophenyl)borate or triphenylmethyl tetrakis (pentafluorophenyl)borate.

7. The propylene copolymer according to claim 1, wherein the intrinsic viscosity [η] measured in tetralin solvent at a temperature of 135° C. is 0.3 to 10.

8. The propylene copolymer according to claim 1, wherein the molecular weight distribution (Mw/Mn) measured with gel permeation chromatography (GPC) is no more than 5.

9. The propylene copolymer according to claim 1, wherein the copolymer has neither the peak of more than 1 J/g based on the melting of the crystal nor the peak of more than 1 J/g based on the crystallization.

10. The propylene copolymer according to claim 1, wherein the copolymer satisfies the following equation:

$$[y/(100-x)] \geq 0.45$$

wherein X represents a propylene content (mol. %) in the copolymer, and y represents the content (mol. %) of α-olefin having carbon atoms of 4–20 in the copolymer.

11. The propylene copolymer according to claim 1, wherein the copolymer satisfies the following equation:

$$[y/(100-x)] < 0.45$$

wherein X represents a propylene content (mol. %) in the copolymer, and y represents the content (mol. %) of α-olefin having carbon atoms of 4–20 in the copolymer.

12. The propylene copolymer according to claim 1, wherein the copolymer is used as a polyolefin resin modifier.

13. The polypropylene copolymer according to claim 1, wherein $X^3$ in the general formula [II] or [III] represents an oxygen atom.

* * * * *